Patented Oct. 14, 1930

1,778,021

UNITED STATES PATENT OFFICE

ALBERT D. CARDINET, OF LOS ANGELES, CALIFORNIA, ASSIGNOR TO ANTROL LABORATORIES INC., OF LOS ANGELES, CALIFORNIA, A CORPORATION OF CALIFORNIA

INSECTICIDAL MEAL

No Drawing. Application filed February 9, 1928. Serial No. 253,220.

This invention relates to improvements in an insecticidal meal, and has for one of its principal objects the provision of a product used as an insecticide, and which is in the form of a meal, whereby the same can be easily spread in desired places for the control of insects and also snails, slugs, cutworms, earwigs, grasshoppers, sowbugs, and other pests.

One of the important objects of this invention is the provision of an insecticide which comprises novel ingredients, and which, furthermore, is prepared by the use of a distinctive process whereby a new product results, which may be used in quite an efficient manner for accomplishing desired results.

Still another and further important object of this invention is the provision of an insecticidal meal which includes in its composition ground pineapple meal, which is a by-product of the pineapple packing industry, and which, when used in an insecticidal composition such as that of the present invention, will furnish an outlet for this by-product and a new use for the same.

Other and further important objects will be apparent from the disclosures in the following specification.

The invention, in a preferred form, is hereinafter more fully described.

The product is as follows:

A mixture of ground pineapple meal, which comprises the trimmings, core, and waste pulp resulting from the canning of pineapple and juice expression of the same, and which is then dried and ground, forming a by-product of the pineapple packing industry, is mixed with shorts, tricalcium arsenate, molasses, and also a coloring matter and flavor, if desired.

The shorts, also known as bran, can be substituted by corn meal, cotton-seed meal, cocoanut meal, peanut meal, and similar ingredients.

The molasses is preferably of a specific gravity of 1.42, which approximates 43° Baumé, and in the use of the process is previously heated to a temperature ranging from 125° to 170° Fahrenheit.

Any coloring matter may be added to improve the appearance of the finished product, which may be either in the form of an inert and insoluble pigment or a water soluble or other color.

Some flavor, either natural or artificial, preferably simulating a fruit flavor, may be added to increase the attractiveness to insects, either through the sense of taste or smell.

The preferred composition of the ingredients is as follows:

Pineapple meal, from_____25% to 75%
Shorts (or bran, etc.), from____25% to 75%
Tricalcium arsenate, from_____ 2% to 25%
43° Baumé molasses, from_____10% to 40%
Coloring matter, from_____0.1% to 10%
Flavor, from_____0.1% to 10% and these proportions may be varied between the above limits as desired without affecting the efficacy of the product.

The ingredients, in dry form (excepting, of course, the molasses), are first thoroughly mixed in a suitable mixer for a period ranging from one to ten minutes, according to the weight or volume of the batch, whereupon the heated molasses is added in small, regulated quantities by means of a spray operated by compressed air or by means of a reservoir perforated at the bottom, while at the same time the mass is continuously kept in motion in the mechanical mixer. By the use of this process undesirable balls of molasses are eliminated and a thorough incorporation of the ingredients into the mixture is accomplished after a period varying from five to fifteen minutes.

After this operation the mass, more or less damp, is placed in sacks and retained for several days, usually varying from five days to two weeks or more, and this allows the absorption of the molasses by the various ingredients comprising the shorts, pineapple meal, or their substitutes. If desired, this drawing and absorption may be accomplished more quickly by the use of a vacuum drier.

After this seasoning has been accomplished the mixture is ground and then put through sieves, ranging from ten to thirty mesh, which produces a meal sufficiently dry to prevent caking in the sacks or cartons in which it is shipped. The molasses acts as a binder for the active ingredients, namely, the tricalcium arsenate, and retains the same in a peculiar state of combination with the various meals used.

It will be evident that herein is provided an insecticidal product in the form of a meal, which is readily available for use, can be conveniently and economically prepared and shipped, and which, further, on account of its peculiar constitution and the proportions of the ingredients, may be accommodated for the control of various insects and other pests, depending upon their peculiar characteristics. Again, the composition comprises the use of by-products which have been found to be particularly adaptable for this special use, and the process itself is novel as obtaining the best advantages and the most desired results from the ingredients and for the purposes intended.

I am aware that many changes may be made in the ingredients themselves, and numerous details with respect to the proportions and also with respect to the method of preparation varied throughout a wide range without departing from the principles of this invention, and I therefore do not purpose limiting the patent granted hereon otherwise than as necessitated by the prior art.

I claim as my invention:

1. An insecticidal meal, including in combination, pineapple meal, shorts, tricalcium arsenate, and molasses.

2. A process of preparing an insecticidal meal, comprising the preliminary mixing of pineapple meal, bran, tricalcium arsenate, coloring matter, and flavor in desired proportions in a mixer, a later addition of hot molasses to the ingredients while continuing the mixing process, a retaining of the damp mass for a period of several days for absorption and drying, a later grinding, and a final sifting to a specified degree of fineness.

In testimony whereof I have affixed my signature.

ALBERT D. CARDINET.